(12) United States Patent
Delafontaine et al.

(10) Patent No.: US 12,606,923 B2
(45) Date of Patent: Apr. 21, 2026

(54) ACID-FREE PYROLYTIC SYNTHESIS OF M-N-C CATALYST

(71) Applicant: The Regents of the University of California, Oakland, CA (US)

(72) Inventors: Laurent Delafontaine, Irvine, CA (US); Plamen Atanassov, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 521 days.

(21) Appl. No.: 18/215,101

(22) Filed: Jun. 27, 2023

(65) Prior Publication Data

US 2023/0416934 A1 Dec. 28, 2023

Related U.S. Application Data

(60) Provisional application No. 63/355,699, filed on Jun. 27, 2022.

(51) Int. Cl.
| | |
|---|---|
| *C25B 11/091* | (2021.01) |
| *B01J 37/00* | (2006.01) |
| *B01J 37/16* | (2006.01) |
| *C25B 9/17* | (2021.01) |
| *H01M 4/90* | (2006.01) |

(52) U.S. Cl.
CPC ......... *C25B 11/091* (2021.01); *B01J 37/0063* (2013.01); *B01J 37/16* (2013.01); *C25B 9/17* (2021.01); *H01M 4/9083* (2013.01)

(58) Field of Classification Search
CPC ......... B01J 37/0063; B01J 37/16; C25B 1/04; C25B 1/23; C25B 1/27; C25B 9/17; C25B 11/052; C25B 11/075; C25B 11/091; H01M 4/9083
See application file for complete search history.

(56) References Cited

PUBLICATIONS

Singh, D.K., et al., 2016, Angewandte Chemie International Edition, 55, 2032-2036. < http://dx.doi.org/10.1002/anie.201509054> (Year: 2016).*
Delatontaine, L, et al., 2023, ACS Applied Energy Materials, 6, 678-691. <https://doi.org/10.1021/acsaem.2c02811> (Year: 2023).*

* cited by examiner

*Primary Examiner* — Brian A McCaig
(74) *Attorney, Agent, or Firm* — NGUYEN TARBET IP LAW

(57) ABSTRACT

A method for making a catalyst includes a step of forming a first reaction mixture that includes a metal source, a nitrogen source, and at least one silica template. Characteristically, the at least one silica template including silica particles. A combination of the first reaction mixture and a fluorinated polymer is mechanochemically mixed to form a first pre-pyrolysis powder. A first pyrolysis of the first pre-pyrolysis powder is performed at a first temperature greater than about 800° C. under an inert atmosphere to form a first pyrolyzed composition. Advantageously, at least a portion of silica particles is removed and mesostructured carbon is formed. The first pyrolyzed composition is optionally mechanochemically mixing to form a second pre-pyrolysis powder. A second pyrolysis of the first first pyrolyzed composition or the second pre-pyrolysis powder is performed under a reductive atmosphere at a second temperature that is greater than about 800° C. to form a final catalyst powder.

33 Claims, 11 Drawing Sheets

2.745 % v/v CO reactor effluent at -1.1 V vs. RHE 0.020 % v/v H$_2$ reactor effluent at -1.1 V vs. RHE

ACID-FREE PYROLYTIC SYNTHESIS OF M-N-C CATALYST

CROSS-REFERENCE TO RELATED APPLICATIONS

This application claims the benefit of U.S. provisional application Ser. No. 63/355,699 filed Jun. 27, 2022, the disclosure of which is hereby incorporated in its entirety by reference herein.

STATEMENT REGARDING FEDERALLY SPONSORED RESEARCH OR DEVELOPMENT

The invention was made with Government support under Contract No. CHE-1338173 awarded by the National Science Foundation Major Research Instrumentation Program and under Contract No. DMR-2011967 awarded by the National Science Foundation through the UC Irvine Materials Research Science and Engineering Center. The Government has certain rights to the invention.

TECHNICAL FIELD

In at least one aspect, the present invention is related to energy, electrocatalytic materials, and non-platinum group metal catalysts. In another aspect, the present invention is related to a rapid facile synthesis of a highly active electrocatalyst for fuel cell/energy conversion applications including but not limited to the oxygen reduction reaction, $CO_2$ electroreduction, and $N_2$ reduction reaction.

BACKGROUND

Among the most active platinum group metal-free benchmark catalysts for energy conversion (e.g., fuel cell/$CO_2$ electroreduction/$N_2$ electroreduction) are metal-nitrogen-doped carbon electrocatalysts synthesized by various means. These metal-nitrogen-doped carbon catalysts are produced by pyrolytic means and offer atomically dispersed metal active sites with high atom utilization resulting in high electrocatalytic activity. The synthesis proceeds through one of three major categories of synthesis protocols: either through soft-template approach[1-5], hard-templating with silica[6-12], sacrificial polymer approach [13-15], or through a combination of the methods above such as by the combined sacrificial polymer and sacrificial metal organic framework (MOF) approach [15].

Use of MOFs such as Zn-based ZIF-8 as pyrolytic precursors is a powerful soft-templating approach to synthesizing M-N—C catalysts. Utilizing ZIF-8, an optimized Fe—N—C was synthesized by soft-template method in 2011 which achieved an impressive 0.9 W cm-2geo in an H2/O2 polymer electrolyte membrane fuel cell (PEMFC).[16] The silica hard-templating approach discussed more below has been refined for over a decade which has yielded arguably the top M-N—C candidate for replacing platinum-group metal electrocatalysts. A third method is the sacrificial polymer approach which utilizes nitrogen-doped polymers (e.g., polyaniline, and polypyrrole) as dual nitrogen/carbon source which upon polymerization in the presence of a metallic salt, and pyrolytic treatment followed by acid washing yields a highly active M-N—C catalyst[13]. These methods each offer different routes to a highly efficient electrocatalyst however they each also have substantial synthetic limitations which impede their large-scale commercialization.

These challenges can be simplified to three main obstacles: (i). use of the hard-template approach or the sacrificial polymer approach requires an acid-wash step (usually in harsh hydrofluoric acid or caustic KOH) which increases the synthesis time substantially and requires the disposal of large quantities of acids/bases which increases the overall cost of the process, (ii). the syntheses produce catalysts with modest active site density (SD) which impedes their overall catalytic throughput, and (iii). the intermediate acid-wash step to produce the state-of-the-art M-N—C catalysts before the final pyrolysis complicates the process by requiring a hands-on transferring of the step for acid-wash and back to the pyrolysis chamber which limits its industrial scale-up.

By way of example, the state-of-the-art catalyst identified by Chen et al [6] this year and [17] in 2020 are produced by hard-templating with silica. This method was developed by the Atanassov lab in 2008 and has since been commercialized by Pajarito Powder© due to the high electrocatalytic activity of the catalysts produced by this synthesis technique. This approach initially necessitated a metal macrocycle (e.g., metal porphyrin), but the process has since been simplified to utilize simple metallic salts, and common nitrogen/carbon precursors mixed in optimum ratios with silica particles of varying particle size/surface areas[19, 20]. The proper ratio of silica precursor(s) and their respective particle sizes have a substantial impact on the final pore size distribution and eventually lead to a hierarchical porosity with beneficial electrocatalytic properties. This precursor mixture is subjected to a first pyrolysis in inert or reductive atmosphere(s) followed by an acid washing step in highly concentrated (25 wt. %) hydrofluoric acid (HF) to generate a high degree of mesoporosity through the hard templating effect. The silica templating production of M-N—C catalysts by Pajarito Powder has been shown to produce less M-Nx (a chemical moiety integral to its electrocatalytic activity) than laboratory batches from University of New Mexico (UNM) where the technique was developed[17]. This is evidence of the limitations in the industrial scale-up of this synthesis technique. To date, no silica hard-template synthesis of M-N—C catalysts has been accomplished that completely avoids the utilization of harsh acids/bases while also not relying on the utilization of metal macrocycles.

Accordingly, there is a need for improved methods for making M-N—C catalysts.

SUMMARY

In at least one aspect, a method for making a catalyst is provided. The method includes a step of forming a first reaction mixture that includes a metal source, a nitrogen source, and at least one silica template. Characteristically, the at least one silica template includes silica particles. A combination of the first reaction mixture and a fluorinated polymer is mechanochemically mixed (e.g., ball milled) to form a first pre-pyrolysis powder. A first pyrolysis of the first pre-pyrolysis powder is performed at a first temperature greater than about 800° C. under an inert atmosphere to form a first pyrolyzed composition. Advantageously, at least a portion of silica particles is removed and mesostructured carbon is formed. The first pyrolyzed composition is mechanochemically mixed (e.g., ball milled) to form a second pre-pyrolysis powder. A second pyrolysis of the second pre-pyrolysis powder is performed under a reductive atmosphere at a second temperature that is greater than about 800° C. to form a final catalyst powder.

In another aspect, the catalysts provided herein present selectivity that exceeds the state-of-the-art single Ni site catalysts for $CO_2$ reduction to CO prepared by more time-consuming methods or through resorting to pyrolysis of metal porphyrins.[22-6] The catalysts present Ni nanoparticiesimetallic Ni phase(s) which are separate from the exclusively graphitic/amorphous carbon phases observed by XRD/HRTEM for single Ni sites in Ni—N—C(atomically dispersed Ni—N—C). These sites when exposed to aqueous electrolyte usually promote the parasitic production of 112 and hence are usually avoided in the synthesis of single-atom M-N—C catalysts.[23, 27, 28] In the catalyst produced by the method set forth herein, the presence of Nickel nanoparticles does not promote HER and the catalyst remains selective for CO at all potentials. Additionally, the activity as measured by electrolysis on a benchtop flow cell is comparable or higher than the state-of-the-art catalyst produced by competing syntheses. [29, 30] Implementation into an industrial-type electrolyzer is needed to assess their overall activity and stability at a high current density similar to the investigation by Moller et al. However, the results show that the catalyst shows high activity and selectivity on a benchtop flow cell which merits its industrial consideration for a $CO_2$ reduction cathode materials In another aspect, the catalysts described herein can be used for the reduction of $CO_2$ to CO.[31]

In another aspect, a fluorinated polymer is used for the removal of silica during a first pyrolysis step.

In another aspect, the catalysts described herein can be used for ORR applications in fuel cells or OER in alkaline electrolyzers. It effectively may be used to update the sacrificial support method and sacrificial polymer approach which both require an acid/alkaline wash step [32].

In another aspect, a method for making a nitrogen-doped porous carbon is provided. The method includes a step of forming a first reaction mixture that includes a nitrogen and carbon source, a silica source, and a fluorinated polymer. The first reaction mixture is mechanochemically mixed to form a first pre-pyrolysis powder. A first pyrolysis of the first pre-pyrolysis powder is performed to form a first pyrolyzed composition. The first pyrolysis is performed at a first temperature greater than about 800° C. and under an inert atmosphere such that at least a portion of silica particles is removed and mesostructured carbon is formed. A second pyrolysis of the first pyrolyzed composition is performed to form a nitrogen-doped porous carbon. Typically, the second pyrolysis can be performed under a reductive atmosphere at a second temperature that is greater than about 800° C.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1A:
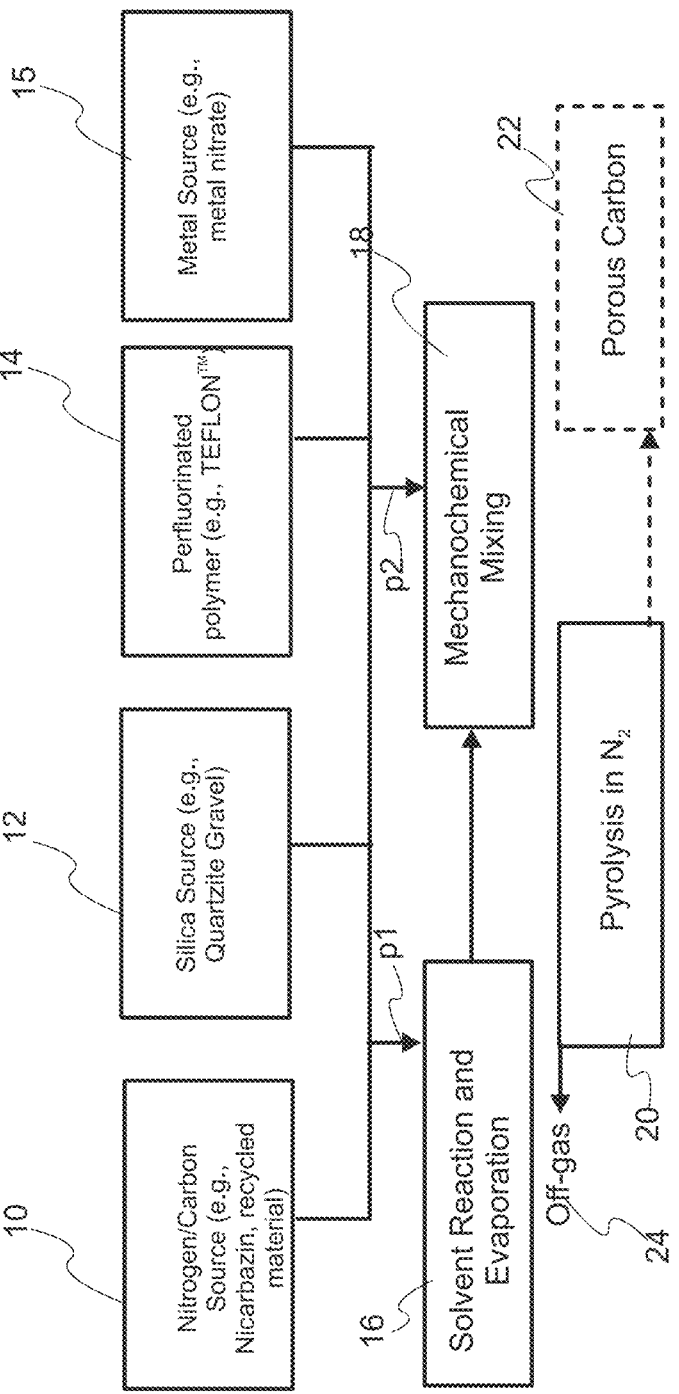
FIG. 1A. Flowchart depicting a method for forming nitrogen-doped porous carbon, and in particular, a M-N—C catalyst FIG. 1B. Flowchart depicting a method for treating the off-gases from the process of FIG. 1A is provided.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g. pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

Throughout this application, where publications are referenced, the disclosures of these publications in their entireties are hereby incorporated by reference into this application to more fully describe the state of the art to which this invention pertains.

The term "M-N—C catalyst" refers to a catalyst in which a transition metal is coordinated with nitrogen and carbon atoms. M-N—C catalyst car used in cross-coupling reactions, hydrogenation reactions, oxidation reactions, and nitrogen fixation.

Abbreviations:

"BET" means Brunauer-Emmett-Teller.

"M-N—C" means metal, nitrogen, and carbon.

"ORR" means the oxygen reduction reaction.

"RHE" means reversible hydrogen electrode.

"SSM" means sacrificial support method.

In an embodiment, a method for making a catalyst is provided. The method includes a step of forming a first reaction mixture that includes a metal source, a nitrogen source, and at least one silica template. Characteristically, the at least one silica template includes silica particles. A combination of the first reaction mixture and a fluorinated polymer is mechanochemically mixed (e.g., ball milled) to form a first pre-pyrolysis powder. A first pyrolysis of the first pre-pyrolysis powder is performed at a first temperature greater than about 800° C. under an inert atmosphere (e.g., a 95% to 100% nitrogen gas environment) to form a first pyrolyzed composition. Advantageously, at least a portion of silica particles is removed to form micron sized and/or mesostructured (e.g., 2 to 50 nm) carbon. The first pyrolyzed composition is mechanochemically mixed (e.g., ball milled) to form a second pre-pyrolysis powder. A second pyrolysis of the second pre-pyrolysis powder or the first pyrolyzed composition is performed under a reductive atmosphere at a second temperature that is greater than about 800° C. to form a final catalyst powder. In one variation, the catalyst is a transition metal-nitrogen-carbon catalyst. In some variations, the first temperature and the second temperature are greater than about, in increasing order of preference, 800° C., 850° C., 900° C., or 1000° C. and less than, in increasing order of preference, 1800° C., 1600° C., 1500° C., 1400° C., or 1300° C.

Examples of mechanochemical mixing, include, but are not limited to, high energy ball mixing, mortar and pestle grinding, vibrational ball milling, twin screw extrusion, planetary ball milling, stirred media milling, and the like. In a refinement, the first reaction mixture is homogenized prior to the first mechanochemically mixed step.

In another refinement, the reductive atmosphere for the second pyrolysis includes at least 5 weight percent ammonia in nitrogen gas. In some refinements, the reductive atmosphere for the second pyrolysis includes at least in increasing order of preference, 5 weight percent, 10 weight percent, 15 weight percent, 20 weight percent, or 25 weight percent, ammonia in nitrogen gas, and at most in increasing order of preference 40 weight percent, 35 weight percent, 30 weight percent, 28 weight percent, or 26 weight percent, ammonia in nitrogen gas In a variation, for the first pyrolysis, a first initial temperature is ramped up to a first final temperature over a first predetermined time period, the first final temperature being held for a first hold time. In a refinement, the first initial temperature is ramped up with a rate of about 1 to 10°

C./minute, the first final temperature is from about 800 to 1000° C., and the first hold time is 1 to 5 hours.

In a variation for the second pyrolysis, a second initial temperature is ramped up to a second final temperature over a second predetermined time period, the second final temperature being held for a second hold time. In a refinement, the second initial temperature is ramped up with a rate of about 1 to 10° C./minute, the second final temperature is from about 800 to 1000° C., and the second hold time is 0.1 to 3 hours.

As set forth above, a fluorinated polymer is used for removal of silica during the first pyrolysis step. In a refinement, the fluorinated polymer is a perfluorinated polymer. Examples of fluorinated polymers include poly(tetrafluoroethylene) (i.e., TEFLON®), fluorinated ethylene propylene, perfluoroethylene propylene, and the like.

As set forth above, the first reaction mixture can include a metal source. Typically, the metal source is a metal salt, and in particular, metal nitrates, metal sulfates, metal carbonates, and the like. Examples of metal sources include but are not limited to an iron(III) salt, a nickel(II) salt, a manganese(II) salt, a cobalt(II) salt, and combinations thereof.

In a variation, the nitrogen source includes amide functional groups or amino functional groups. For example, compounds having amide functional groups can be described by formula R—(C=O)—NR$_1$R$_2$ wherein R, R$_1$, R$_2$ are each independently H or C$_{1-20}$ alkyl where at least one of R, R$_1$, R$_2$ are a C$_{1-20}$ alkyl. Compounds having amino functional groups NRR$_1$R$_2$ wherein R, R$_1$, R$_2$ are each independently H or C$_{1-20}$ alkyl where at least one of R, R$_1$, R$_2$ are a C$_{1-20}$ alkyl. In a refinement, the nitrogen source includes nicarbazin. Nicarbazin is a combination of, and in particular, an equimolar complex of 1,3-bis (4-nitrophenyl) urea and 4-6 dimethyl-2-(1H)— pyrimidinone. It should also be appreciated that these nitrogen sources can also function as carbon sources.

In a variation, the at least one silica template includes fumed silica or precipitated silica. In a refinement, the at least one silica template includes silica having a particle size distribution that induces a hierarchical porosity in the final catalyst powder. In a further refinement, the at least one silica template includes silica particles having a diameter less than about 500 nm. In some refinements, the at least one silica template includes Stober spheres.

In another embodiment, an M-N—C catalyst formed by the methods set forth above is provided. In such catalysts, the nitrogen atoms are introduced into the carbon support to modify and enhance the catalytic properties of the metal. Advantageously, the M-N—C catalysts can be used to catalyze various electrochemical reactions. Such reactions find applications in energy conversion and storage. In a variation, the average pore diameters are from about 5 to 100 nm and the average BET surface area is from about 400 to 1000 m$^2$g$^{-1}$.

In another embodiment, a supported catalyst includes a precious group metal catalyst supported on the catalysts, and in particular, the M-N—C catalysts set forth above. Examples of precious metals include gold, silver, platinum, palladium, rhodium, and ruthenium.

Referring to FIG. 1A, a flowchart depicting a method for forming nitrogen-doped porous carbon, and in particular, a M-N—C catalyst as described above is provided. The method involves mixing a nitrogen/carbon source 10, silica sources 12 of varying particle sizes, perfluorinated polymer 15, and optionally a metal source 15. Details for each of these components are set forth above. The varying particle sizes of silica impart hierarchical porosity in the final nitrogen-doped carbon which has beneficial electrocatalytic properties. In a refinement, path p1 is followed in which a solvent reaction/evaporation path 40 is performed followed by mechanochemical mixing (ball-milling step) 50, and then a first pyrolysis ad a second pyrolysis as described above to produce the nitrogen-doped porous carbon. For example, the first pyrolysis being performed at a first temperature greater than about 800° C. and under an inert atmosphere (e.g., nitrogen gas as set forth above) and the second pyrolysis being performed under a reductive atmosphere (e.g., ammonia-containing as set forth above) at a second temperature that is greater than about 800° C. In another refinement, the solvent reaction/evaporation step is skipped and path p2 is followed in which the mechanochemical mixing step 50 is being proceeded to directly. In a refinement, metal source 15 (e.g., a metal nitrate salt) can be added to produce the metallic-substituted nitrogen-doped carbon. In a refinement, the average pore diameters are from about 5 to 100 nm and the average BET surface area is from about 400 to 1000 m$^2$g$^{-1}$.

In a variation, the number of pyrolysis steps can also be reduced to a single mechanochemically mixing step (e.g., ball-milling) followed by a single pyrolysis under an inert atmosphere as described above (e.g., N$_2$-containing) or a reductive atmosphere as described above to produce the nitrogen-doped carbon. The porosity is variable and is by the size of silica used, and that multiple pore size(s) (e.g., meso- and micropores) are achievable by the present method. In a refinement, the average pore diameters are from about 5 to 100 nm and the average BET surface area is from about 400 to 1000 m$^2$g$^{-1}$.

Figure 1B:
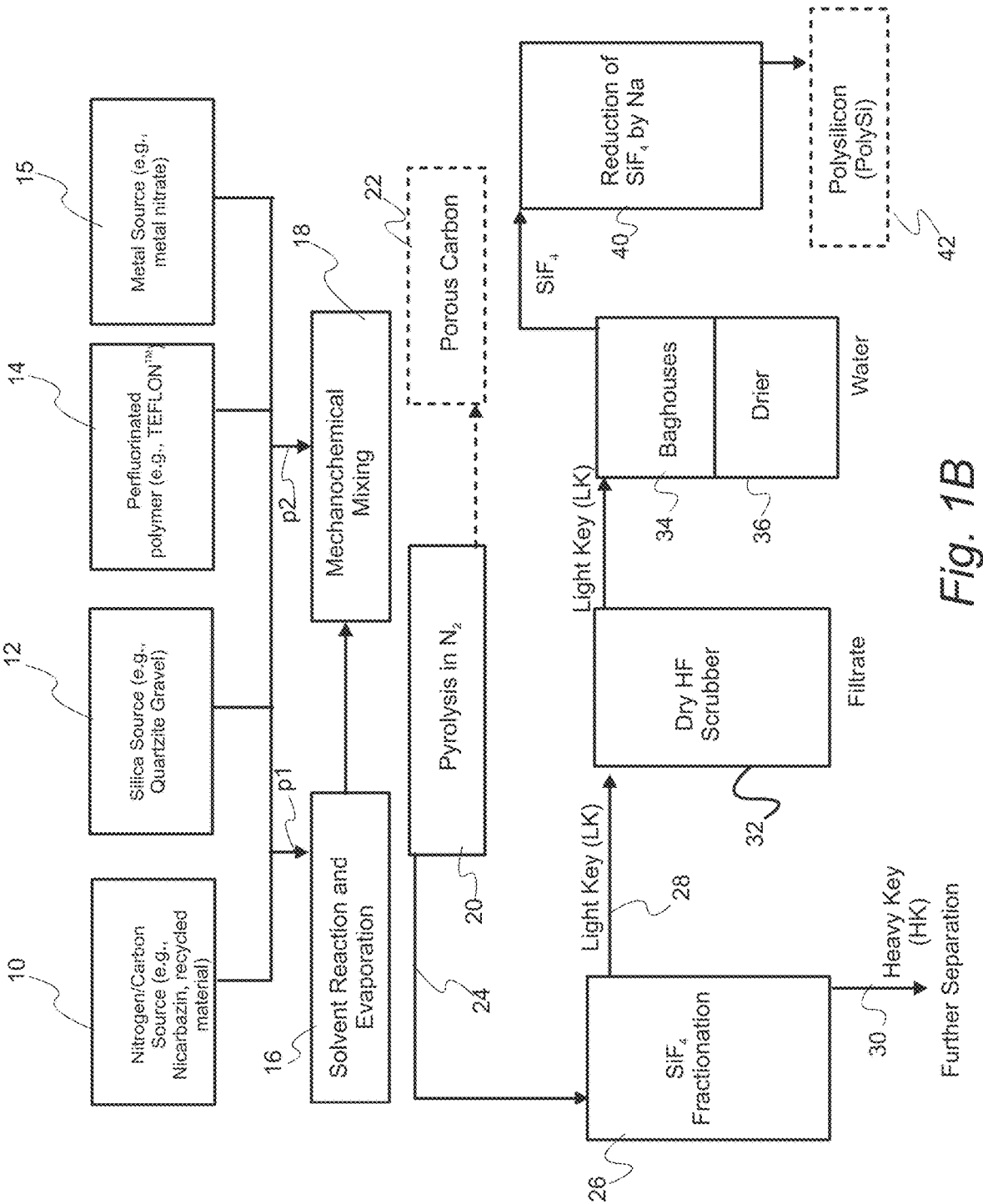

Referring to FIG. 1B, a flowchart depicting a method for treating the off-gases from the process of FIG. 1A is provided. The process of FIG. 1A proceeds through the decomposition of a perfluorinated polymer (e.g., polytetrafluoroethylene) in conjunction with a nitrogen/carbon source which similarly to the decomposition of hydrogen-containing fluoropolymers (e.g., polyvinyl fluoride) gives HF as a major product. [38, 39]. The HF reacts with SiO$_2$ (silica source) to produce SiF$_4$ and H$_2$O according to the following reaction where (v)=vapor phase, (s)=solid phase:

$$SiO_2(s) + 4HF(v) \rightarrow SiF_4(v) + 2H_2O(v)$$

The off-gas products 24 in FIGS. 1A and B are composed of inert gas N$_2$, unreacted HF, SiF$_4$, olefin products, trace hydrofluoropolymer fragments, trace CO/CO$_2$. The major product(s) of the decomposition reaction is expected to be a Light Key (more volatile key) consisting of SiF$_4$ and unreacted HF and a Heavy Key (less volatile key) consisting of olefins (propene, dienes, etc.)$^2$ (FIG. 1B). While the current process is a far expedited way to a porous carbon with high electrocatalytic activity, it also produces SiF$_4$ which is a toxic and corrosive gas. Advantageously, the SiF$_4$ method can be used in existing methods for the production of polycrystalline silicon (polySi).[40] These prior art methods to utilize SiF$_4$ gas as a feed to react with sodium (Na), or Magnesium (Mg).[41] This allows the avoidance of methods in which the SiF$_4$ is first converted to monosilane (SiH$_4$)

The major gaseous product(s) from the current process is gaseous SiF$_4$, HF, and olefin products. These products can be separated by fractionation 26 into a Light Key (LK) 28 containing HF and SiF$_4$ and a Heavy Key (HK) 30 containing majority gaseous olefin compounds. The Heavy Key (HK) may be separated and filtered according to established methods. The Light Key (LK) must pass through first a demister and HF Scrubber 32 that will use caustic to remove HF as a filtrate. The Light Key (LK) with HF removed will then pass to Baghouse(s) 34 to remove entrained particulate(s) and a drier 36 to remove all water which is necessary before sodium pellets are introduced in the final stage. The final product is a Si-fluoride product mixture 38 that is separated and reduced step 40 according to established methods to yield the final polycrystalline silicon material 42. Advantageously, the described process provides with two valuable products (porous carbon) and (polySi) in dotted boxes of FIGS. 1A and 1B.

Figure 2:
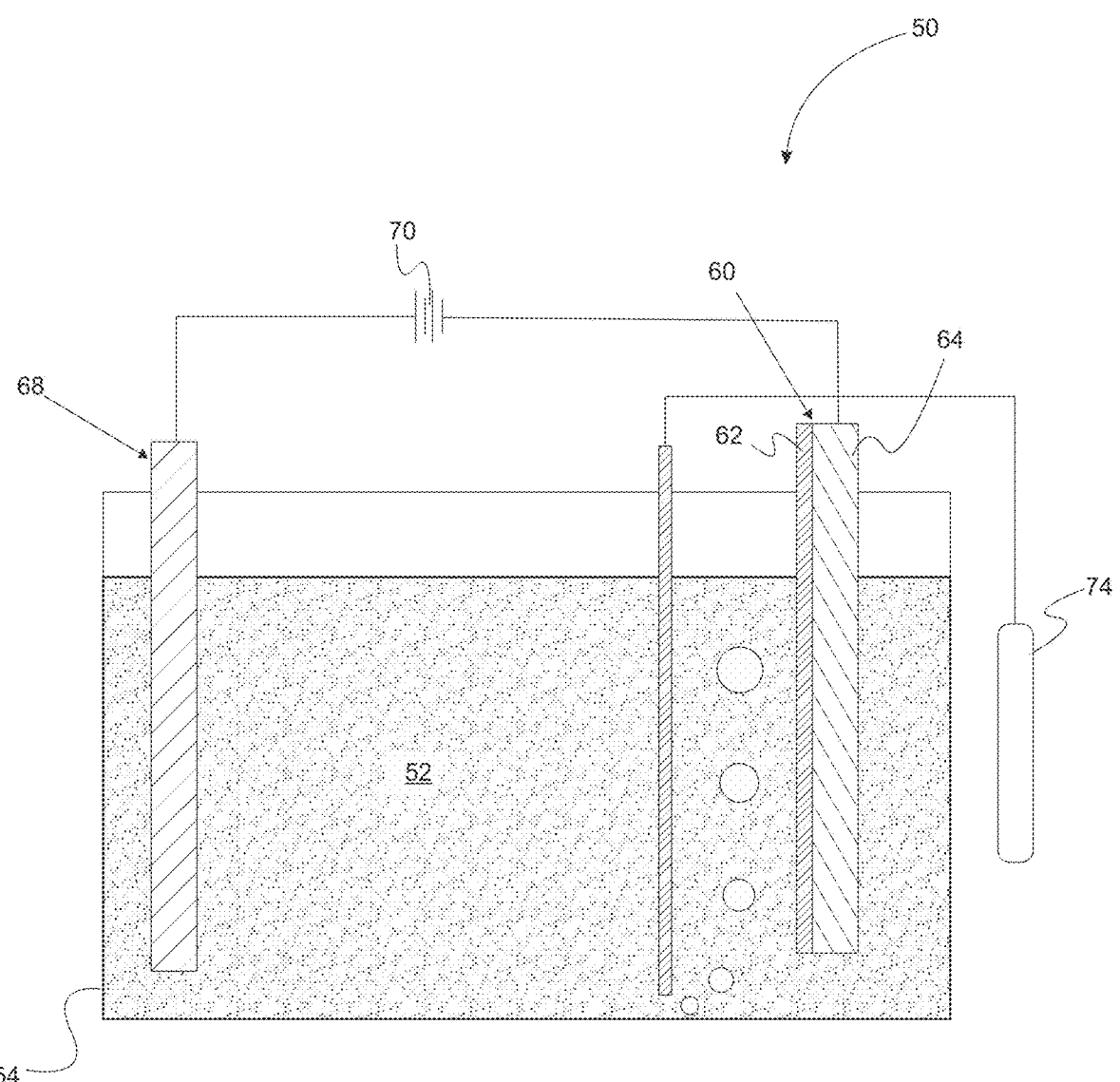
FIG. 2. Schematic of an electrochemical cell using the catalysts set forth herein.

In another embodiment, an electrochemical cell using the catalysts set forth above is provided. Referring to FIG. 2, electrochemical cell 50 includes an electrolyte 52 contained in a vessel 54. Electrochemical cell 50 also includes a catalytically active electrode 60 having an active material 62 disposed on a current collector 64. The active material includes the catalysts and in particular, the M-N—C catalysts set forth above. Electrochemical cell 10 also includes a counter electrode 68. Characteristically, the catalytically active electrode 60 and the counter electrode 68 are immersed in the electrolyte. A voltage source 70 biases the catalytically active electrode relative to the counter electrode.

In a variation, electrochemical cell 50 is configured to reduce of $CO_2$ to CO. In this regard, a system including electrochemical cell 50 includes a carbon dioxide source 74. Typically in this variation, catalytically active electrode 60 is a cathode that is negatively biased with respect to the counter electrode in order to drive the carbon dioxide source for introducing $CO_2$ into the electrochemical cell.

In another variation, electrochemical cell 50 is configured to reduce $N_2$ and/or nitrate.

In another variation, electrochemical cell 50 is configured for an oxygen reduction reaction.

In still another variation, electrochemical cell 50 is configured for an oxygen evolution reaction.

The following examples illustrate the various embodiments of the present invention. Those skilled in the art will recognize many variations that are within the spirit of the present invention and scope of the claims.

The simplified generalized synthesis for acid-free catalyst using Silica template proceeds with a modified synthesis method from Serov and Workman et al. [35, 36]. In a given synthesis (e.g., for Fe—N—C), 6.25 g nicarbazin, 0.6 g iron nitrate nonahydrate, and 3 g silica (composed of 1.25 g LM-150 fumed silica), 1.25 g OX-50, and 0.5 g Stober spheres with an average diameter of 320 nm prepared by Stober's Method which involves base-catalyzed hydrolysis of tetraethyl orthosilicate (TEOS) in a water-ethanol mixture) are dispersed in deionized water, sonicated for 30 minutes or until homogeneous, and then dried at 45 degrees Celsius overnight.

The metal nitrate precursor is chosen to ensure the total number of metal atoms in each catalyst is the same regardless of the metallic substituent according to Table 1.

TABLE 1

| Amount of Metallic Precursor in Pre-ball mill step | | | |
| --- | --- | --- | --- |
| Metallic Substituent | Metallic Precursor | Mass of Catalyst | # Metal Atoms * $10^{20}$ |
| Iron | Iron (III) nitrate nonahydrate | 0.600 | 8.944 |
| Ni | Nickel (II) nitrate hexahydrate | 0.432 | 8.944 |

TABLE 1-continued

| Amount of Metallic Precursor in Pre-ball mill step | | | |
| --- | --- | --- | --- |
| Metallic Substituent | Metallic Precursor | Mass of Catalyst | # Metal Atoms * $10^{20}$ |
| Mn | Manganese (II) nitrate hexahydrate | 0.426 | 8.944 |
| Co | Cobalt (II) nitrate hexahydrate | 0.432 | 8.944 |

The resulting powder is ball-milled at 45 Hz for 1 hour using a mixture of Agate balls and a calculated mass ($m_t$(mg)) of Teflon (Poly(tetrafluoroethylene), powder (free-flowing), 1 µm particle size) based on the wt. % Silica in the powder above according to the following equation:

$$m_t(\text{mg}) = \frac{(\text{mass of powder in step 1(mg))} * \frac{\text{wt. \% SiO}_2}{100}}{\frac{0.09 \text{ mg silica}}{\text{mg Teflon}}}$$

The mixing of catalyst precursor(s) with Teflon serves to prepare the pre-pyrolysis sample for the removal of silica during the first pyrolysis step. This was demonstrated by Singh et al for the generation of mesostructured carbon for supercapacitor applications.

Figure 3:
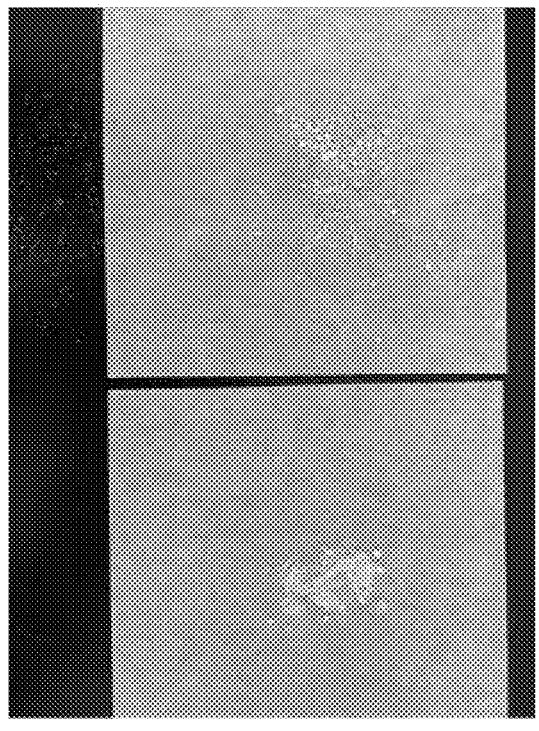
FIG. 3. Precursor mixture before ball milling; Bottom: Precursor mixture post ball milling, pre first pyrolysis.

Advantage arises from the ball milling step and the pyrolysis parameters to generate an M-N—C catalyst with exceptional electrochemical performance. The ball milling step above is a mechanochemical process that creates a homogeneous pre-pyrolysis powder. The color change from the top of FIG. 3 (pre-ball mill powder) to the bottom of FIG. 3 (post-ball mill powder) confirms that the powder has been made homogeneous as no isolated white PTFE powder remains. In addition, the overall color change from pale yellow to bright yellow suggests the agate balls impart enough energy to the mixture to cause a chemical reaction between the nicarbazin and metallic nitrate precursor.

The powder is loaded into a weigh boat and subjected to a pyrolysis under 100% $N_2$ atmosphere heating from room temperature to 900° C. with a ramp rate of 5° C./min, and a 180 min hold at 900° C. The powder is ball-milled again with Agate balls at 45 Hz for 1 hour. The resulting powder is placed back into a weigh boat and subjected to the 2nd pyrolysis under a reductive atmosphere of 10% NH3/90% $N_2$, with a 10° C./min ramp rate, and a 30 min hold at 950° C. to obtain the final powder.

Figure 4:
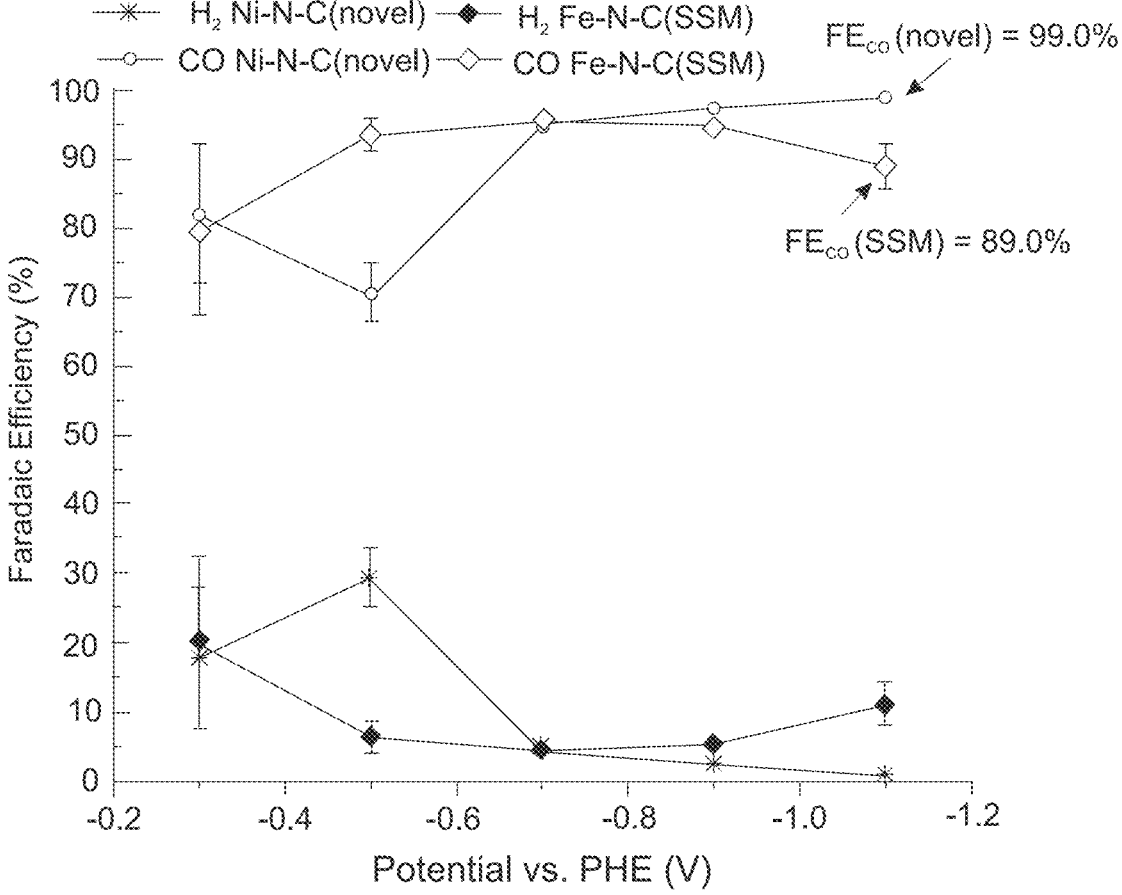
FIG. 4. Faradaic Efficiency (%) for CO or H2 formation for Ni—N—C produced by a novel route or a catalyst benchmark Fe—N—C produced by SSM.
Figure 5:
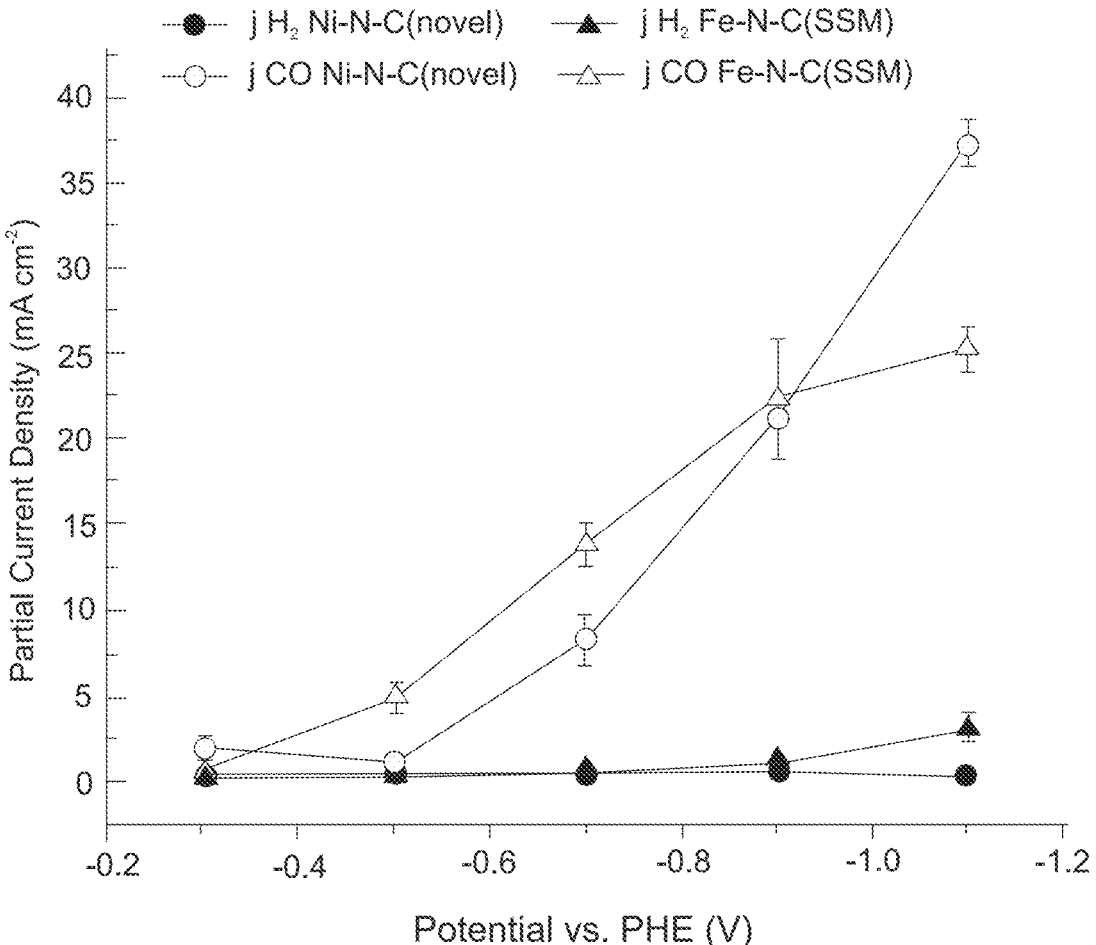
FIG. 5. Partial current density for CO or 112 plotted vs. applied potential (V) vs. RHE.
Figure 6A:
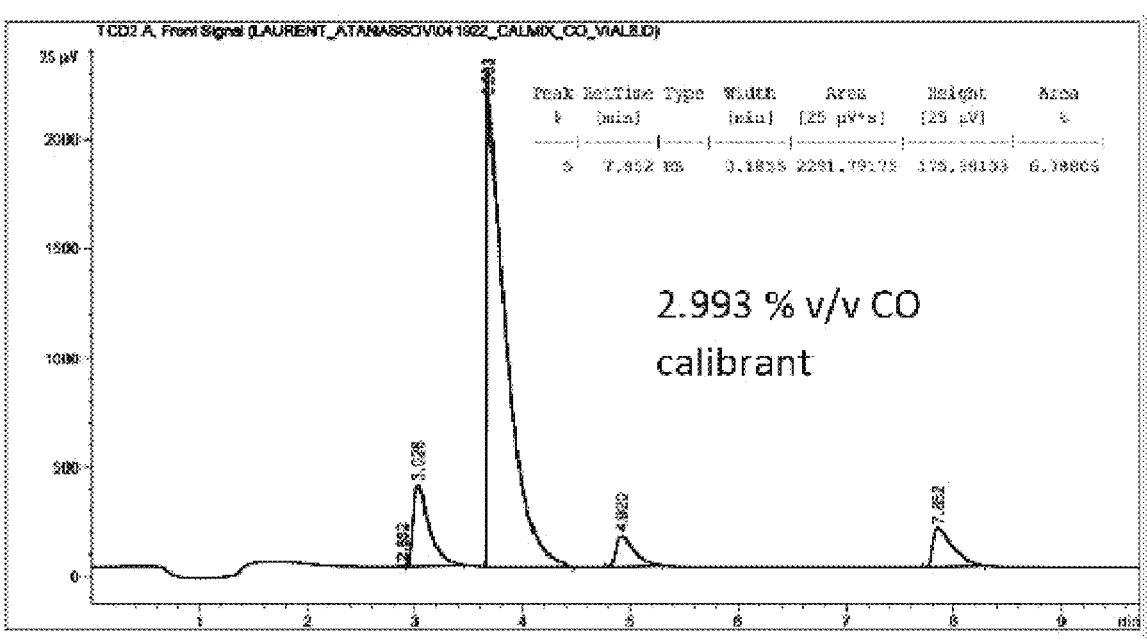
FIGS. 6A, 6B, 6C, and 6D. GC data. A) Sample CO calibrant gas with CO elution (7.75 min+/−0.1 min) peak area. B) Sample $H_2$ calibrant gas with $H_2$ elution (2.35 min+/−0.1 min) peak area. C, D) Reactor effluent at −1.1 V vs. RHE cathodic potential for novel Ni—N—C at 1.06 mg/cm 2 catalyst loading. This corresponds to 36.1 mA cm$^{-2}$ for CO partial current density and 0.3 mA cm$^{-2}$ $H_2$ partial current density. The selectivity for this trial is 99.3% faradaic efficiency for CO formation and % faradaic efficiency for $H_2$ formation.
Figure 6B:
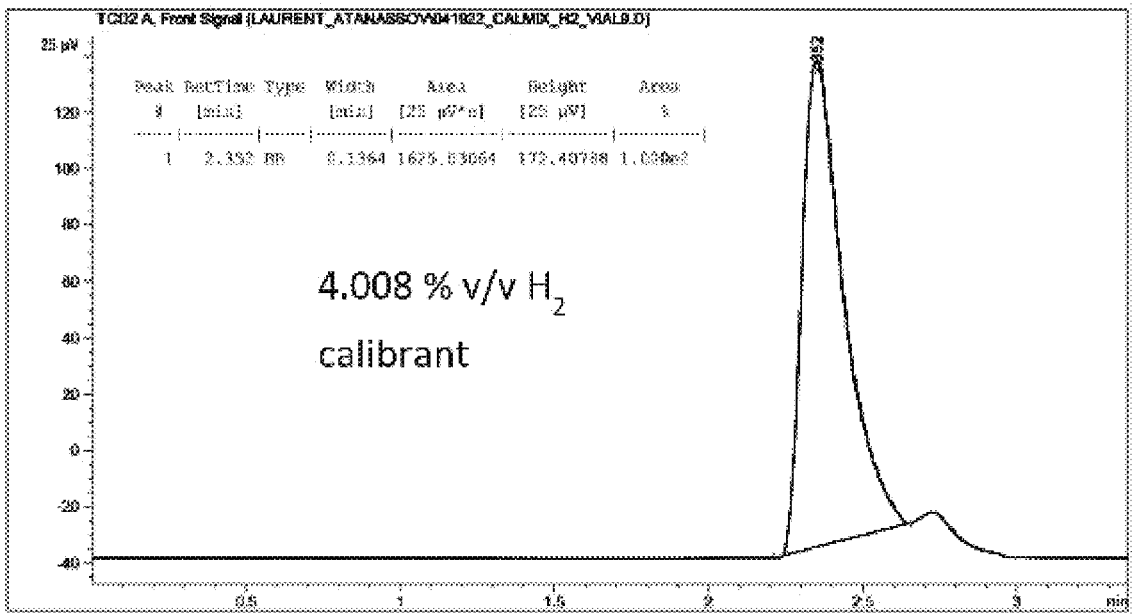
Figure 6C:
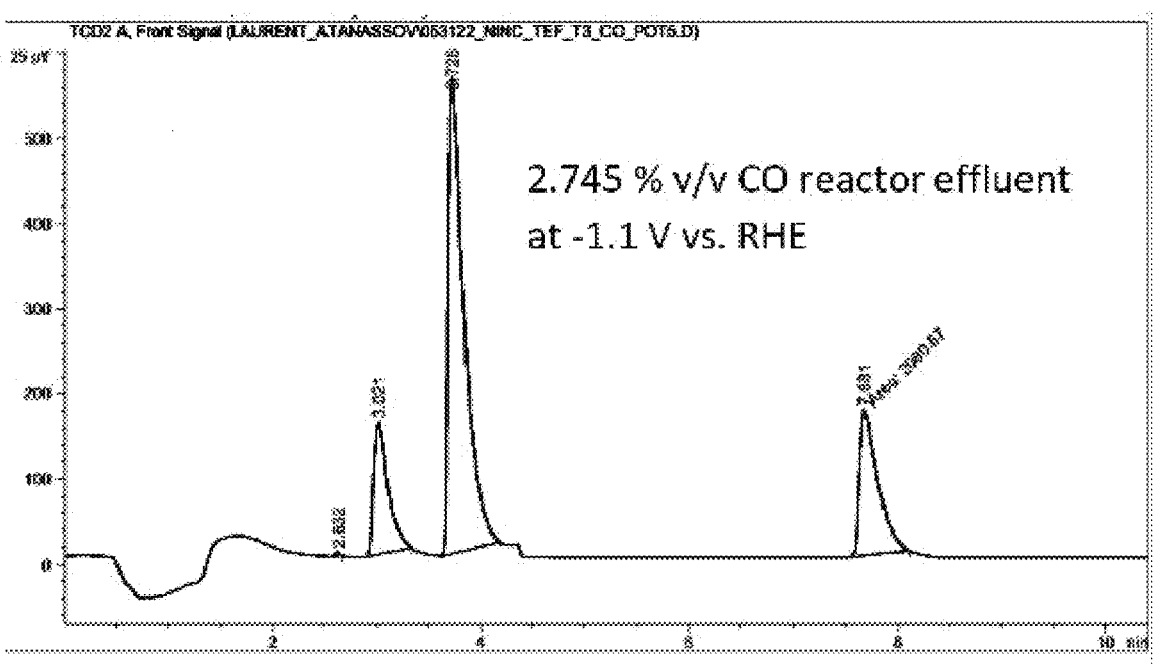
Figure 6D:
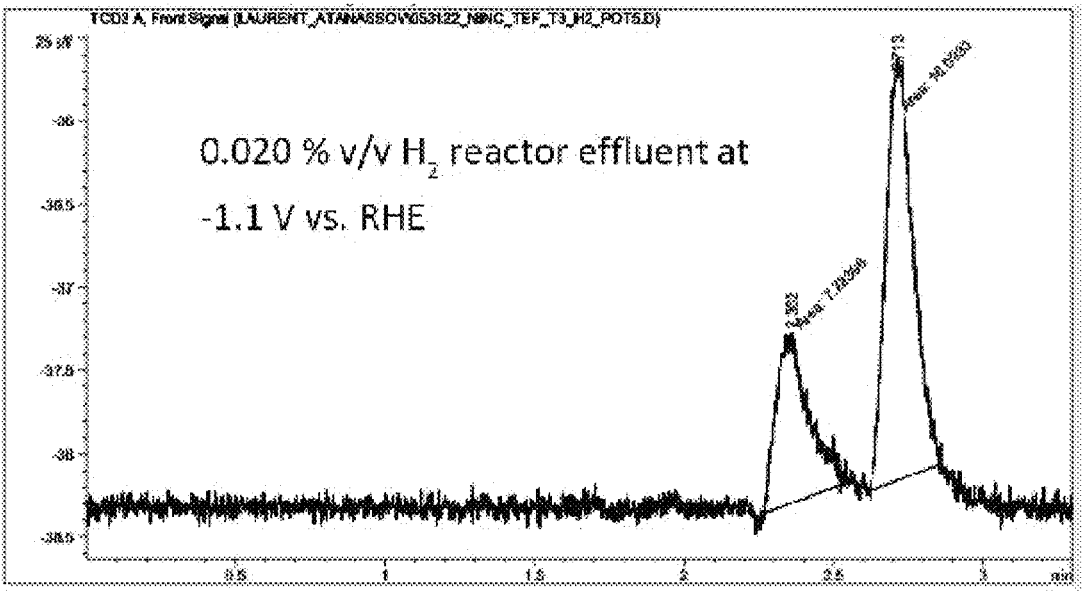

FIGS. 4 and 5 show that the Ni—N—C has comparable activity for $CO_2$ electroreduction to Fe—N—C produced by the conventional sacrificial support method (SSM). Only at −0.5 V vs. RHE does the conventional catalyst outperform the examples of the novel catalysts in terms of selectivity. On the other hand, the novel catalysts outperform the conventional catalysts in terms of maximum activity and selectivity at a high potential of −1.1 V vs. RHE (99.0 vs. 89.0% $FE_{co}$ for the novel and conventional catalysts, respectively).

FIG. 6 provides GC data. FIG. 6A shows sample CO calibrant gas with CO elution (7.75 min+/−0.1 min) peak area. FIG. 6B shows sample $H_2$ calibrant gas with $H_2$ elution (2.35 min+/−0.1 min) peak area. FIGS. 6C and D show reactor effluent at −1.1 V vs. RHE cathodic potential for novel Ni—N—C at 1.06 mg/cm² catalyst loading. This corresponds to 36.1 mA cm⁻² for CO partial current density and 0.3 mA cm⁻² $H_2$ partial current density. The selectivity for this trial is 99.3% faradaic efficiency for CO formation and 0.7% faradaic efficiency for $H_2$ formation.

Figure 7:
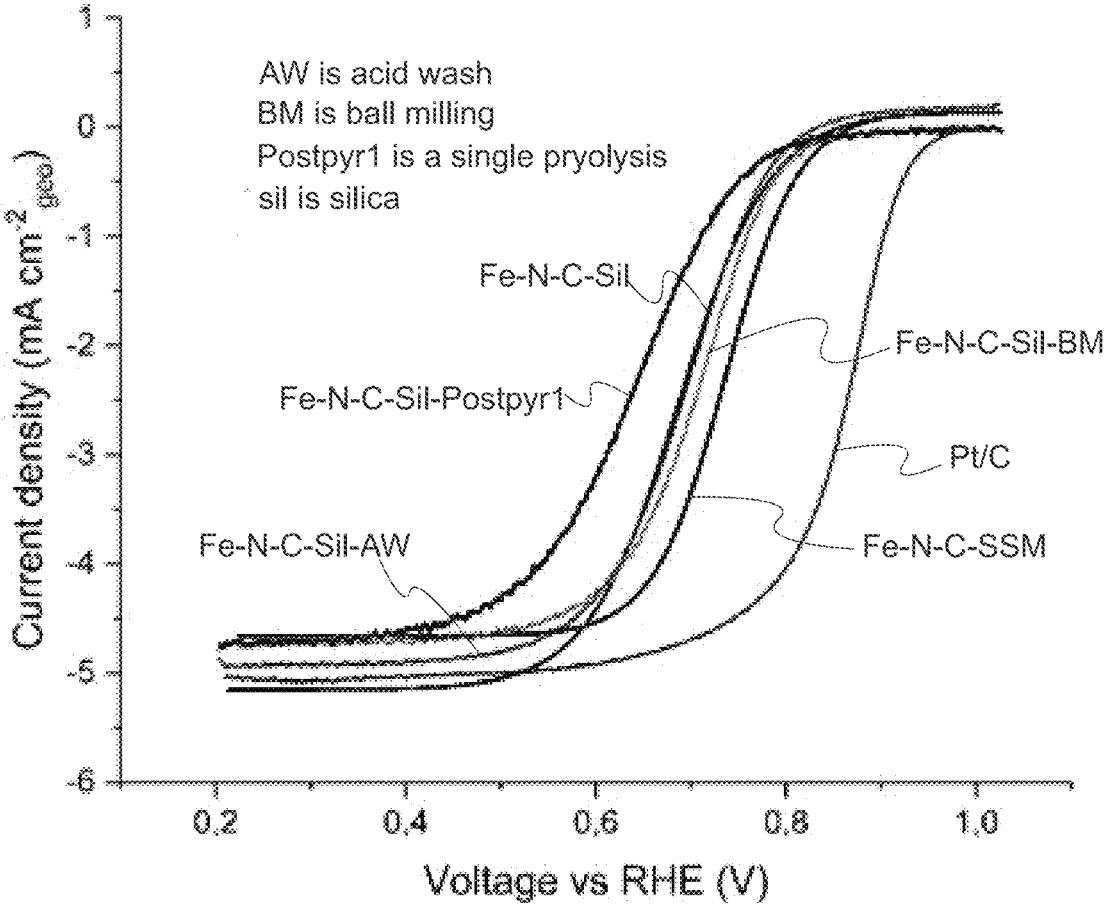
FIG. 7. ORR performance of Fe—N—C produced by novel method vs. Fe—N—C produced by conventional sacrificial support method (SSM) vs. PGM benchmark of Pt/C.

FIG. 7 provides the ORR performance of Fe—N—C produced by a novel method vs. Fe—N—C produced by conventional sacrificial support method (SSM) vs. PGM benchmark of Pt/C. This figures shows that the novel Fe—N—C(yellow curve) shows comparable but slightly less performance for ORR than the Fe—N—C produced by conventional SSM (red curve). The half wave potential ($E_{1/2}$) for Fe—N—C(novel) is close but slightly less than Fe—N—C(SSM) and considerably less than Pt/C (black curve) indicating slightly reduced ORR activity as a direct electrocatalyst. The use of the catalyst as an electrocatalyst support remains unexplored but will be studied soon (1-2 weeks).

Figure 8A:
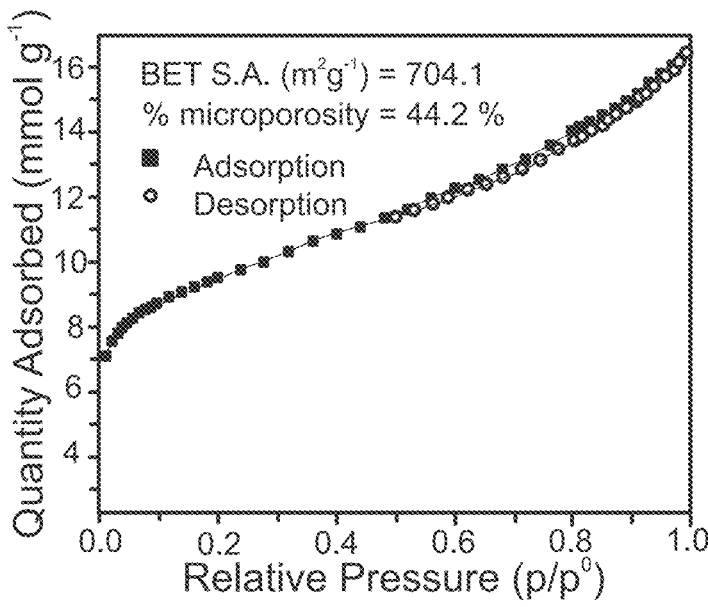
FIG. 8A. BET adsorption/desorption isotherm.
Figure 8B:
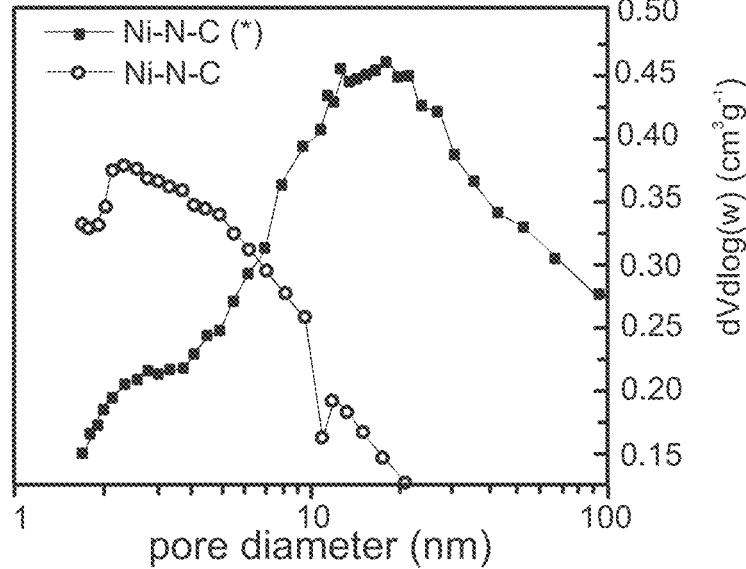
FIG. 8B. BJH Adsorption pore size distribution for Ni—N—C and Ni—N—C (*)
Figure 9A:
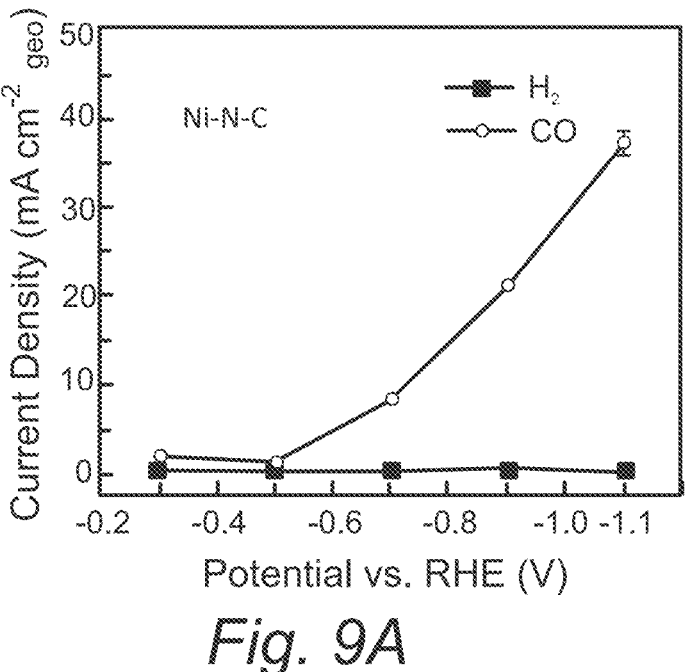
FIG. 9A. Electrochemical data Ni—N—C.
Figure 9B:
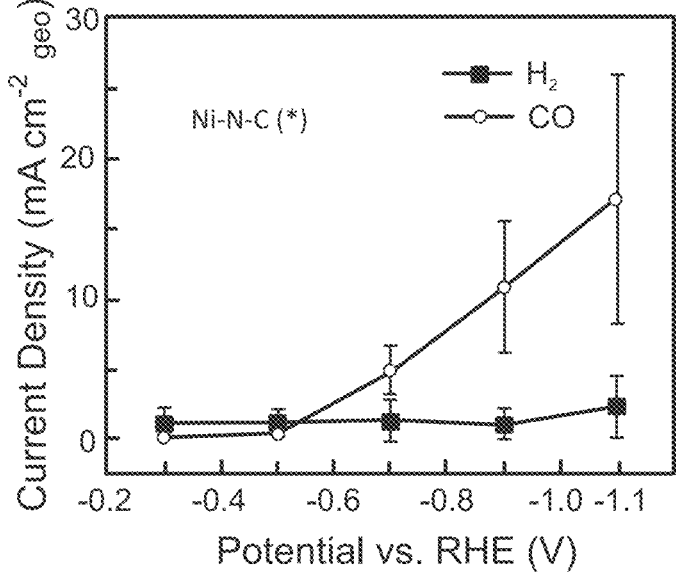
FIG. 9B. Electrochemical data Ni—N—C (*).

FIGS. 8A and 8B provide BET results and porosity profiles. FIGS. 9A and 9B provide electrochemical data. The silica precursors used in this experiments are shown in the Table 2. The large silica particle template are Stober Spheres synthesized to a particle size of 320 nm. The smallest effective silica particle template is Aerosil OX50 having an average particle size of 40 nm. When the particle size is reduced (i.e., by adding higher surface area silica precursors in Aerosil 90, Aerosil 200, Cab-O-Sil LM-150), it appears that the silica particles coalesce and prevent the further decrease of pore diameter/increase in surface area. However, when the small silica template is removed in Ni—N—C (*), a large increase in pore diameter and a decrease in surface area is observed. Using a silica mixture with a smaller average particle size (i.e., including Aerosil OX50) leads to smaller pore diameters in Ni—N—C versus Ni—N—C (*). This results in higher overall current density and selectivity for $CO_2$ reduction. When the size of silica is reduced in Ni—N—C compared to Ni—N—C (*), the BET Surface area increases from 483 to 704 $m^2g^{-1}$ and the percent microporosity increases from 40.6% to 44.2%.

TABLE 2

Silica Precursors used for M—N—C Electrocatalyst Synthesis.

| Sample | Nicarbazin (g) | Stöber Sphere ($D_{avg}$ = 320 nm) (g) | Aerosil OX 50 (g) | Aerosil 90 (g) | Cab-0-Sil LM-150 (g) | Aerosil 200 (g) |
|---|---|---|---|---|---|---|
| M—N—C (M=Fe, Ni, Mn, Co) | 6.25 | 0.5 | 1.25 | — | 1.25 | — |
| Ni—N—C (*) | 6.25 | 0.5 | — | 0.9375 | 1.25 | 0.3125 |
| Ni—N—C (**) | 6.25 | 0.5 | 2.5 | — | — | — |

Additional details of the methods and catalysts described above are found in Laurent Delafontaine, Alessio Cosenza, Eamonn Murphy, Yuanchao Liu, Jiazhe Chen, Baiyu Sun, and Plamen Atanassov. *Metal-Nitrogen-Carbon Catalysts by Dynamic Template Removal for Highly Efficient and Selective Electroreduction of CO₂*. ACS Applied Energy Materials 2023 6 (2), 678-691, DOI: the entire disclosure of which is hereby incorporated by reference in its entirety.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various

REFERENCES

1. Asset, T., et al., Investigating the nature of the active sites for the $CO_2$ reduction reaction on carbon-based electrocatalysts. ACS Catalysis, 2019. 9(9): p. 7668-7678.
2. Barkholtz, H. M. and D.-J. Liu, Advancements in rationally designed PGM-free fuel cell catalysts derived from metal-organic frameworks. Materials Horizons, 2017. 4(1): p. 20-37.
3. Ma, S., et al., Cobalt imidazolate framework as precursor for oxygen reduction reaction electrocatalysts. Chemistry—A European Journal, 2011. 17(7): p. 2063-2067.
4. Morozan, A. and F. Jaouen, Metal organic frameworks for electrochemical applications. Energy & environmental science, 2012. 5(11): p. 9269-9290.
5. Armel, V., J. Hannauer, and F. Jaouen, Effect of zif-8 crystal size on the O2 electroreduction performance of pyrolyzed Fe—N—C catalysts. Catalysts, 2015. 5(3): p. 1333-1351.
6. Chen, Y., et al., Catalysts by pyrolysis: Direct observation of transformations during re-pyrolysis of transition metal-nitrogen-carbon materials leading to state-of-the-art platinum group metal-free electrocatalyst. Materials Today, 2022.
7. Gokhale, R., et al., Novel dual templating approach for preparation of highly active Fe—NC electrocatalyst for oxygen reduction. Electrochimica Acta, 2017. 224: p. 49-55.
8. Serov, A., et al., Nano-structured non-platinum catalysts for automotive fuel cell application. Nano Energy, 2015. 16: p. 293-300.
9. Serov, A., et al., Highly active and durable templated non-PGM cathode catalysts derived from iron and aminoantipyrine. Electrochemistry Communications, 2012. 22: p. 53-56.
10. Liu, G., et al., Development of non-precious metal oxygen-reduction catalysts for PEM fuel cells based on N-doped ordered porous carbon. Applied Catalysis B: Environmental, 2009. 93(1-2): p. 156-165.
11. Videla, A. H. M., et al., Varying the morphology of Fe—NC electrocatalysts by templating Iron Phthalocyanine precursor with different porous $SiO_2$ to promote the Oxygen Reduction Reaction. Electrochimica Acta, 2015. 177: p. 43-50.
12. Sa, Y. J., et al., A general approach to preferential formation of active Fe—N x sites in Fe—N/C electrocatalysts for efficient oxygen reduction reaction. Journal of the American Chemical Society, 2016. 138(45): p. 15046-15056.
13. Chung, H. T., et al., Direct atomic-level insight into the active sites of a high-performance PGM-free ORR catalyst. Science, 2017. 357(6350): p. 479-484.
14. Yin, X., et al., PGM-free ORR catalysts designed by templating PANI-type polymers containing functional groups with high affinity to iron. Journal of The Electrochemical Society, 2019. 166(7): p. F3240.
15. Shui, J., et al., Highly efficient nonprecious metal catalyst prepared with metal-organic framework in a continuous carbon nanofibrous network. Proceedings of the National Academy of Sciences, 2015. 112(34): p. 10629-10634.
16. Proietti, E., et al., Iron-based cathode catalyst with enhanced power density in polymer electrolyte membrane fuel cells. Nature communications, 2011. 2(1): p. 1-9.

17. Primbs, M., et al., Establishing reactivity descriptors for platinum group metal (PGM)-free Fe—N—C catalysts for PEM fuel cells. Energy & Environmental Science, 2020. 13(8): p. 2480-2500.

18. Pylypenko, S., et al., Non-platinum oxygen reduction electrocatalysts based on pyrolyzed transition metal macrocycles. Electrochimica Acta, 2008. 53(27): p. 7875-7883.

19. Serov, A., et al., Original mechanochemical synthesis of non-platinum group metals oxygen reduction reaction catalysts assisted by sacrificial support method. Electrochimica Acta, 2015. 179: p. 154-160.

20. Workman, M. J., et al., Fe—N—C catalyst graphitic layer structure and fuel cell performance. ACS Energy Letters, 2017. 2(7): p. 1489-1493.

21. Singh, D. K., et al., No more HF: teflon-assisted ultrafast removal of silica to generate high-surface-area mesostructured carbon for enhanced $CO_2$ capture and supercapacitor performance. Angewandte Chemie International Edition, 2016. 55(6): p. 2032-2036.

22. Möller, T., et al., Efficient CO 2 to CO electrolysis on solid Ni—N—C catalysts at industrial current densities. Energy & Environmental Science, 2019. 12(2): p. 640-647.

23. Wang, C., et al., Typical transition metal single-atom catalysts with a metal-pyridine N structure for efficient $CO_2$ electroreduction. Applied Catalysis B: Environmental, 2021. 296: p. 120331.

24. Varela, A. S., W. Ju, and P. Strasser, Molecular nitrogen—carbon catalysts, solid metal organic framework catalysts, and solid metal/nitrogen-doped carbon (MNC) catalysts for the electrochemical $CO_2$ reduction. Advanced Energy Materials, 2018. 8(30): p. 1703614.

25. Lin, L., et al., Temperature-Dependent $CO_2$ Electroreduction over Fe—N—C and Ni—N—C Single-Atom Catalysts. Angewandte Chemie, 2021. 133(51): p. 26786-26790.

26. Jia, C., K. Dastafkan, and C. Zhao, Key factors for designing single-atom metal-nitrogen-carbon catalysts for electrochemical $CO_2$ reduction. Current Opinion in Electrochemistry, 2022. 31: p. 100854.

27. Jia, M., et al., Carbon-supported Ni nanoparticles for efficient CO 2 electroreduction. Chemical science, 2018. 9(47): p. 8775-8780.

28. Tan, D., et al., Nitrogen-carbon layer coated nickel nanoparticles for efficient electrocatalytic reduction of carbon dioxide. Nano Research, 2019. 12(5): p. 1167-1172.

29. Pan, F., et al., Identification of champion transition metals centers in metal and nitrogen-codoped carbon catalysts for $CO_2$ reduction. Applied Catalysis B: Environmental, 2018. 226: p. 463-472.

30. Li, C., et al., Covalent Organic Framework (COF) Derived Ni—N—C Catalysts for Electrochemical $CO_2$ Reduction: Unraveling Fundamental Kinetic and Structural Parameters of the Active Sites. Angewandte Chemie, 2022. 134(15): p. e202114707.

31. Overa, S., et al., Electrochemical Approaches for $CO_2$ Conversion to Chemicals: A Journey toward Practical Applications. Accounts of Chemical Research, 2022. 55(5): p. 638-648.

32. Asset, T., F. Maillard, and F. Jaouen, Electrocatalysis with Single-Metal Atom Sites in Doped Carbon Matrices. Supported Metal Single Atom Catalysis, 2022: p. 531-582.

33. Murphy, E., et al., Highly Durable and Selective Fe- and Mo-Based Atomically Dispersed Electrocatalysts for Nitrate Reduction to Ammonia via Distinct and Synergized NO2-Pathways. ACS Catalysis, 2022. 12: p. 6651-6662.

34. Speck, F. D., et al., Single-atom catalysts: a perspective toward application in electrochemical energy conversion. JACS Au, 2021. 1(8): p. 1086-1100.

35. Serov, A., et al., Original mechanochemical synthesis of non-platinum group metals oxygen reduction reaction catalysts assisted by sacrificial support method. Electrochimica Acta, 2015. 179: p. 154-160.

36. Workman, M. J., et al., Fe—N—C catalyst graphitic layer structure and fuel cell performance. ACS Energy Letters, 2017. 2(7): p. 1489-1493.

37. Stober, W., A. Fink, and E. Bohn, Controlled growth of monodisperse silica spheres in the micron size range. Journal of colloid and interface science, 1968. 26(1): p. 62-69.

38. Madorsky, S. I., Hart, V. E., Straus, S., & Sedlak, V. A. (1953). Thermal degradation of tetrafluoroethylene and hydrofluoroethylene polymers in a vacuum. In Journal of Research of the National Bureau of Standards (Vol. 51, Issue 6, p. 327). National Institute of Standards and Technology (NIST). https://doi.org/10.6028/jres.051.036

39. Farneth, W. E., Aronson, M. T., & Uschold, R. E. (1993). Degradation mechanisms of poly(vinyl fluoride) films. In Macromolecules (Vol. 26, Issue 18, pp. 4765-4769). American Chemical Society (ACS). https://doi.org/10.1021/ma00070a006

40. Xie, X., Lau, K., & Sanjurjo, A. (2016). Production of solar-grade silicon: A comparison study of the reduction of SiF<inf>4</inf> with Na, Mg, or Al metals. In 2016 IEEE 43rd Photovoltaic Specialists Conference (PVSC). 2016 IEEE 43rd Photovoltaic Specialists Conference (PVSC). IEEE. https://doi.org/10.1109/pvsc.2016.7749691

41. International Pat. Appl. No. WO2010046751A2.

42. Xie, X., Lau, K., & Sanjurjo, A. (2016). Production of solar-grade silicon: A comparison study of the reduction of SiF<inf>4</inf> with Na, Mg, or Al metals. In 2016 IEEE 43rd Photovoltaic Specialists Conference (PVSC). 2016 IEEE 43rd Photovoltaic Specialists Conference (PVSC). IEEE. https://doi.org/10.1109/pvsc.2016.7749691.

What is claimed is:

1. A method for making a catalyst comprising:

a) forming a first reaction mixture that includes a metal source, a nitrogen source, and at least one silica template, the at least one silica template including silica particles;

b) mechanochemically mixing a combination of the first reaction mixture and a fluorinated polymer to form a first pre-pyrolysis powder;

c) performing a first pyrolysis of the first pre-pyrolysis powder to form a first pyrolyzed composition, the first pyrolysis being performed at a first temperature greater than about 800° C. and under an inert atmosphere such that at least a portion of silica particles is removed and mesostructured carbon is formed;

d) optionally mechanochemical mixing the first pyrolyzed composition to form a second pre-pyrolysis powder; and e) performing a second pyrolysis of the first pyrolyzed composition or the second pre-pyrolysis powder to form a final catalyst powder, the second pyrolysis being performed under a reductive atmosphere at a second temperature that is greater than about 800° C.

2. The method of claim 1, wherein the catalyst is a transition metal-nitrogen-carbon catalyst.

3. The method of claim 1, wherein the first reaction mixture is homogenized prior to step b).

4. The method of claim 1, wherein the inert atmosphere in step c) is a nitrogen gas environment.

5. The method of claim 1, wherein the reductive atmosphere in step e) includes at least 5 weight percent ammonia in nitrogen gas.

6. The method of claim 1, wherein for the first pyrolysis, a first initial temperature is ramped up to a first final temperature over a first predetermined time period, the first final temperature being held for a first hold time.

7. The method of claim 6, wherein the first initial temperature is ramped up with a rate of about 1 to 10° C./minute, the first final temperature is from about 800 to 1000° C., and the first hold time is 1 to 5 hours.

8. The method of claim 6, wherein for the second pyrolysis, a second initial temperature is ramped up to a second final temperature over a second predetermined time period, the second final temperature being held for a second hold time.

9. The method of claim 8, wherein the second initial temperature is ramped up with a rate of about 1 to 10° C./minute, the second final temperature is from about 800 to 1000° C., and the second hold time is 0.1 to 3 hours.

10. The method of claim 1, wherein the fluorinated polymer is poly(tetrafluoroethylene).

11. The method of claim 1, wherein the metal source is a metal salt.

12. The method of claim 1, wherein the metal source includes a component selected from the group consisting of an iron(III) salt, a nickel(II) salt, a manganese(II) salt, a cobalt(II) salt, and combinations thereof.

13. The method of claim 1, wherein the nitrogen source includes amide functional groups or amino functional groups.

14. The method of claim 13, wherein the nitrogen source includes nicarbazin.

15. The method of claim 1, wherein the at least one silica template includes fumed silica or precipitated silica.

16. The method of claim 1, wherein the at least one silica template includes silica having a particle size distribution that induces a hierarchical porosity in the final catalyst powder.

17. The method of claim 1, wherein the at least one silica template includes silica particles having a diameter less than about 500 nm.

18. The method of claim 17, wherein the at least one silica template includes Stober spheres.

19. A catalyst made by a method comprising:
   a) forming a first reaction mixture that includes a metal source, a nitrogen source, and at least one silica template, the at least one silica template including silica particles;
   b) mechanochemically mixing a combination of the first reaction mixture and a fluorinated polymer to form a first pre-pyrolysis powder;
   c) performing a first pyrolysis of the first pre-pyrolysis powder to form a first pyrolyzed composition, the first pyrolysis being performed at a first temperature greater than about 800° C. and under an inert atmosphere such that at least a portion of silica particles is removed and mesostructured carbon is formed;
   d) mechanochemically mixing the first pyrolyzed composition to form a second pre-pyrolysis powder; and e) performing a second pyrolysis of the second pre-pyrolysis powder to form a final catalyst powder, the second pyrolysis being performed under a reductive atmosphere at a second temperature that is greater than about 800° C.

20. The catalyst of claim 19, wherein the catalyst is an M-N—C catalyst.

21. The catalyst of claim 20, wherein a precious group metal catalyst is supported on the M-N—C catalyst.

22. An electrochemical cell comprising:
   an electrolyte;
   a catalytically active electrode having an active material disposed on a current collector, the active material including a catalyst made by:
      a) forming a first reaction mixture that includes a metal source, a nitrogen source, and at least one silica template, the at least one silica template including silica particles;
      b) mechanochemically mixing a combination of the first reaction mixture and a fluorinated polymer to form a first pre-pyrolysis powder;
      c) performing a first pyrolysis of the first pre-pyrolysis powder to form a first pyrolyzed composition, the first pyrolysis being performed at a first temperature greater than about 800° C. and under an inert atmosphere such that at least a portion of silica particles is removed and mesostructured carbon is formed;
      d) mechanochemically mixing the first pyrolyzed composition to form a second pre-pyrolysis powder; and
      e) performing a second pyrolysis of the second pre-pyrolysis powder to form a final catalyst powder, the second pyrolysis being performed under a reductive atmosphere at a second temperature that is greater than about 800° C.;
   a counter electrode, wherein the catalytically active electrode and the counter electrode are immersed in the electrolyte; and
   a voltage source that biases the catalytically active electrode relative to the counter electrode.

23. The electrochemical cell of claim 22, wherein the catalyst is an M-N—C catalyst.

24. The electrochemical cell of claim 22 configured to reduce of $CO_2$ to CO.

25. The electrochemical cell of claim 23 further comprising a carbon dioxide source.

26. The electrochemical cell of claim 25, wherein the catalytically active electrode is a cathode that is negatively biased with respect to the counter electrode in order to drive the carbon dioxide source for introducing $CO_2$ into the electrochemical cell.

27. The electrochemical cell of claim 22 configured to reduce of $N_2$ and/or nitrate.

28. The electrochemical cell of claim 22 configured for an oxygen reduction reaction.

29. The electrochemical cell of claim 22 configured for an oxygen evolution reaction.

30. A method for making a nitrogen-doped porous carbon comprising:
   a) forming a first reaction mixture that includes a nitrogen and carbon source, a silica source, and a fluorinated polymer;
   b) mechanochemically mixing the first reaction mixture to form a first pre-pyrolysis powder;
   c) performing a first pyrolysis of the first pre-pyrolysis powder to form a first pyrolyzed composition, the first pyrolysis being performed at a first temperature greater than about 800° C. and under an inert atmosphere such that at least a portion of silica particles is removed and mesostructured carbon is formed; and d) performing a second pyrolysis of the first pyrolyzed composition, to form a nitrogen-doped porous carbon, the second pyrolysis being performed under a reductive atmosphere at a second temperature that is greater than about 800° C.

31. The method of claim 30, wherein the first pyrolyzed composition is mechanochemically mixed prior to step d).

32. The method of claim 30, wherein the first pyrolysis and/or the second pyrolysis produce a out-gas including HF and $SiF_4$.

33. The method of claim 32, wherein the $SiF_4$ is converted to polycrystalline silicon.

* * * * *